(12) United States Patent
Tsujino et al.

(10) Patent No.: US 12,085,186 B2
(45) Date of Patent: Sep. 10, 2024

(54) VALVE AND FLUID CONTROL DEVICE WITH A MAGNETIC INDICATOR

(71) Applicant: Fujikin Incorporated, Osaka (JP)

(72) Inventors: Kengo Tsujino, Osaka (JP); Tomoki Nakada, Osaka (JP); Ryutaro Tanno, Osaka (JP); Yuya Suzuki, Osaka (JP); Akihiro Harada, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/935,670

(22) Filed: Sep. 27, 2022

(65) Prior Publication Data

US 2023/0136072 A1 May 4, 2023

(30) Foreign Application Priority Data

Oct. 29, 2021 (JP) ................................. 2021-178375

(51) Int. Cl.
*F16K 31/126* (2006.01)
*F16K 27/02* (2006.01)

(52) U.S. Cl.
CPC ............ *F16K 31/126* (2013.01); *F16K 27/02* (2013.01)

(58) Field of Classification Search
CPC .... F16K 31/12; F16K 31/122; F16K 31/1225; Y10T 137/2642
See application file for complete search history.

(56) References Cited

U.S. PATENT DOCUMENTS

| | | | | |
|---|---|---|---|---|
| 4,793,241 A | * | 12/1988 | Mano | F15B 15/2861 91/1 |
| 5,063,345 A | * | 11/1991 | Akiyama | G01P 3/488 324/173 |
| 5,144,977 A | * | 9/1992 | Eggerton | F16K 37/0033 137/554 |
| 6,789,570 B2 | * | 9/2004 | Beyrak | F16K 27/041 137/554 |
| 7,557,568 B2 | * | 7/2009 | Terasaki | F15B 15/2861 324/207.2 |

(Continued)

FOREIGN PATENT DOCUMENTS

| | | | | |
|---|---|---|---|---|
| JP | 2001-153261 A | | 6/2001 | |
| JP | 2020112267 A | * | 7/2020 | ............. F15B 21/08 |
| JP | 2021-025529 A | | 2/2021 | |

OTHER PUBLICATIONS

JP-2020112267-A—translation (Year: 2020).*

*Primary Examiner* — Daphne M Barry
(74) *Attorney, Agent, or Firm* — WC&F IP (57) ABSTRACT

A valve which can accurately detect an operation of the valve is provided.
The valve includes a valve body defining a fluid flow passage, a valve disk operating to be able to open and close the fluid flow passage, an actuator driving the valve disk by supplying or interrupting a working fluid, a stem transmitting a driving force of the actuator to the valve disk, a detection means detecting an opening and closing operation of the valve disk, and an elastic member fixing a ring-shaped magnetic body inserted through an end of the stem to the stem. The detection means includes the magnetic body fixed by the elastic member, and a magnetic sensor detecting a change in a magnetic field of the magnetic body.

8 Claims, 9 Drawing Sheets

(56) References Cited

U.S. PATENT DOCUMENTS

| | | | | |
|---|---|---|---|---|
| 7,788,983 | B2* | 9/2010 | Hansson | G01D 5/14 |
| | | | | 73/861.08 |
| 7,886,767 | B2* | 2/2011 | Tschida | F16K 37/0041 |
| | | | | 137/554 |
| 8,240,624 | B2* | 8/2012 | Terasaki | F15B 15/2892 |
| | | | | 248/230.8 |
| 10,385,891 | B2* | 8/2019 | Slama | F16K 37/0025 |
| 10,584,806 | B2* | 3/2020 | Laessler | F15B 15/202 |
| 11,041,578 | B2* | 6/2021 | Priisholm | F16K 37/0041 |
| 2002/0157713 | A1* | 10/2002 | Pimouguet | F16K 37/0041 |
| | | | | 137/554 |
| 2003/0233203 | A1* | 12/2003 | Grumstrup | G05D 16/2095 |
| | | | | 702/100 |
| 2004/0211928 | A1* | 10/2004 | Coura | F16K 1/446 |
| | | | | 251/129.04 |
| 2008/0092960 | A1* | 4/2008 | Manecke | F16K 37/0033 |
| | | | | 137/554 |
| 2011/0290332 | A1* | 12/2011 | Soldo | F16K 37/0033 |
| | | | | 137/15.01 |
| 2013/0233416 | A1* | 9/2013 | Uwe | F16K 37/0025 |
| | | | | 137/554 |
| 2018/0038509 | A1* | 2/2018 | Heimroth | F15B 21/003 |

* cited by examiner

VALVE AND FLUID CONTROL DEVICE WITH A MAGNETIC INDICATOR

TECHNICAL FIELD

The present invention relates to a valve that accommodates therein a sensor inside of a machine and is able to output data detected by the sensor.

BACKGROUND ART

Conventionally, there are many valves equipped with sensors to confirm opening and closing operations of the valves. Among such valves, especially in the valve for integration, a sensor or an operation part is provided on an upper part or an upper surface of the valve so that an operation such as installation or removal of the valve, or an operation such as supply of driving pressure or driving operation can be performed from the upper part of the valve. In the case of such a design, the opening and closing operation of the valve is often detected by the vertical movement of a piston.

In this regard, for example, in Patent Literature 1, discloses an air operation valve for chemicals having a piston rod for opening or closing a valve by reciprocating within a valve body and an indication member connected to the piston rod and inserted into a penetration hole of the valve body, and provided with a detection switch for detecting a location of a tip part of the indication member and a case which covers the detection switch and the tip part of the indication member and is attached to the valve body. Further, in Patent Literature 2, an air operation valve provided with an actuator for raising and lowering a stem by supplying or interrupting a working fluid, and having an opening and closing detection sensor for detecting opening and closing of a valve body accompanying raising and lowering of a piston based on a change in a distance to the piston.

CITATION LIST

Patent Literature

Patent Literature 1: JP 2001-153261A
Patent Literature 2: JP 2021-025529A

SUMMARY OF INVENTION

Technical Problem

However, when the operation of the valve is detected in accordance with the operation of the piston for opening and closing the valve, if the piston is inclined, an object to be detected is inclined, and there is a possibility that detection failure occurs since accurate detection cannot be performed, and if displacement (stroke amount) of the piston is small, the detection accuracy may be further affected.

Therefore, one of the objects of the present invention is to provide a valve capable of accurately detecting the operation of the valve.

Solution to Problem

In order to achieve the above object(s), a valve according to the present invention includes a valve body defining a fluid flow passage, a valve disk operating to open and close the fluid flow passage, an actuator driving the valve disk by supplying or interrupting a working fluid, a stem transmitting a driving force of the actuator to the valve disk, a detection means detecting an opening and closing operation of the valve disk, and an elastic member fixing a ring-shaped magnetic body inserted through an end of the stem to the stem, wherein the detection means includes the magnetic body fixed by the elastic member, and a magnetic sensor detecting a change in a magnetic field of the magnetic body.

A recess may be provided along a circumferential direction on an outer peripheral surface of the stem fixed to the magnetic body, and an inclined part having a diameter expanding outward may be provided at an end of the recess.

The actuator may include an actuator cap storing a pressure chamber, to which a working fluid is supplied, inside, and protruding one end of the stem to an outside on a side opposite to the valve disk, and the valve may further include a sensor cap covering the detection means together with one end of the stem, and a bolt inserted into a bolt hole of the sensor cap is fastened to a fastening groove provided on an outer peripheral surface of the actuator cap.

An inclined part, having a diameter expanding outward, may be formed in a vicinity of the fastening groove.

The magnetic sensor may be attached to an outer surface of the actuator cap.

The magnetic sensor may be attached to an inside of the sensor cap.

It may be configured as a fluid control device including the above-described valve.

Effect of the Invention

According to the valve of the present invention, the operation of the valve can be detected with high accuracy.

PREFERRED EMBODIMENT

Figure 1:
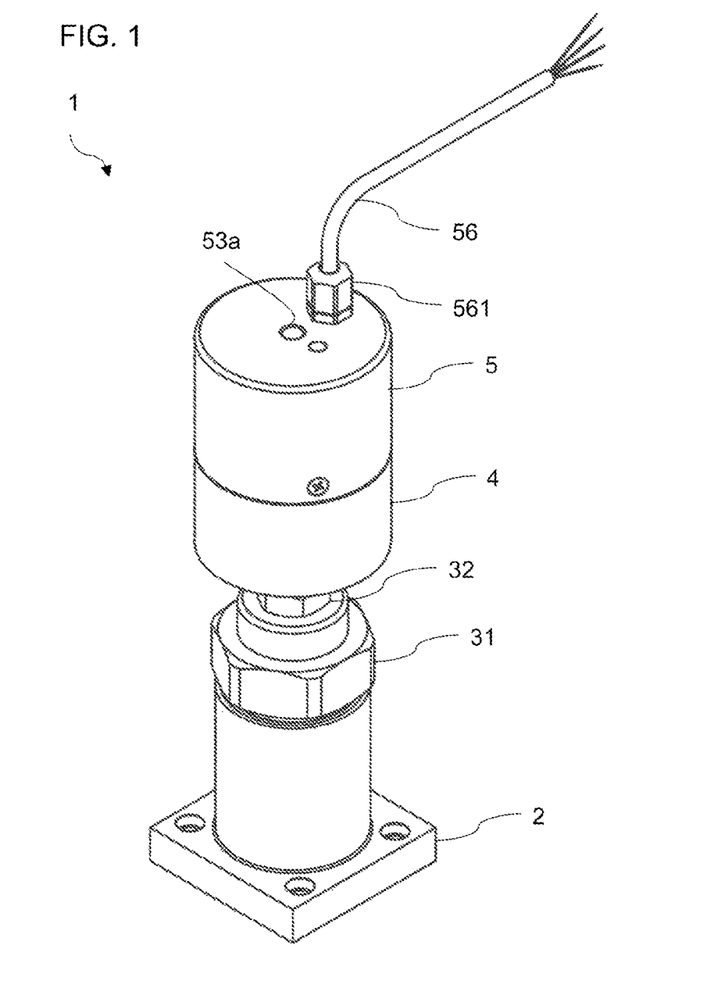
FIG. 1 is an external perspective view illustrating a valve according to an embodiment of the present invention.
Figure 2:
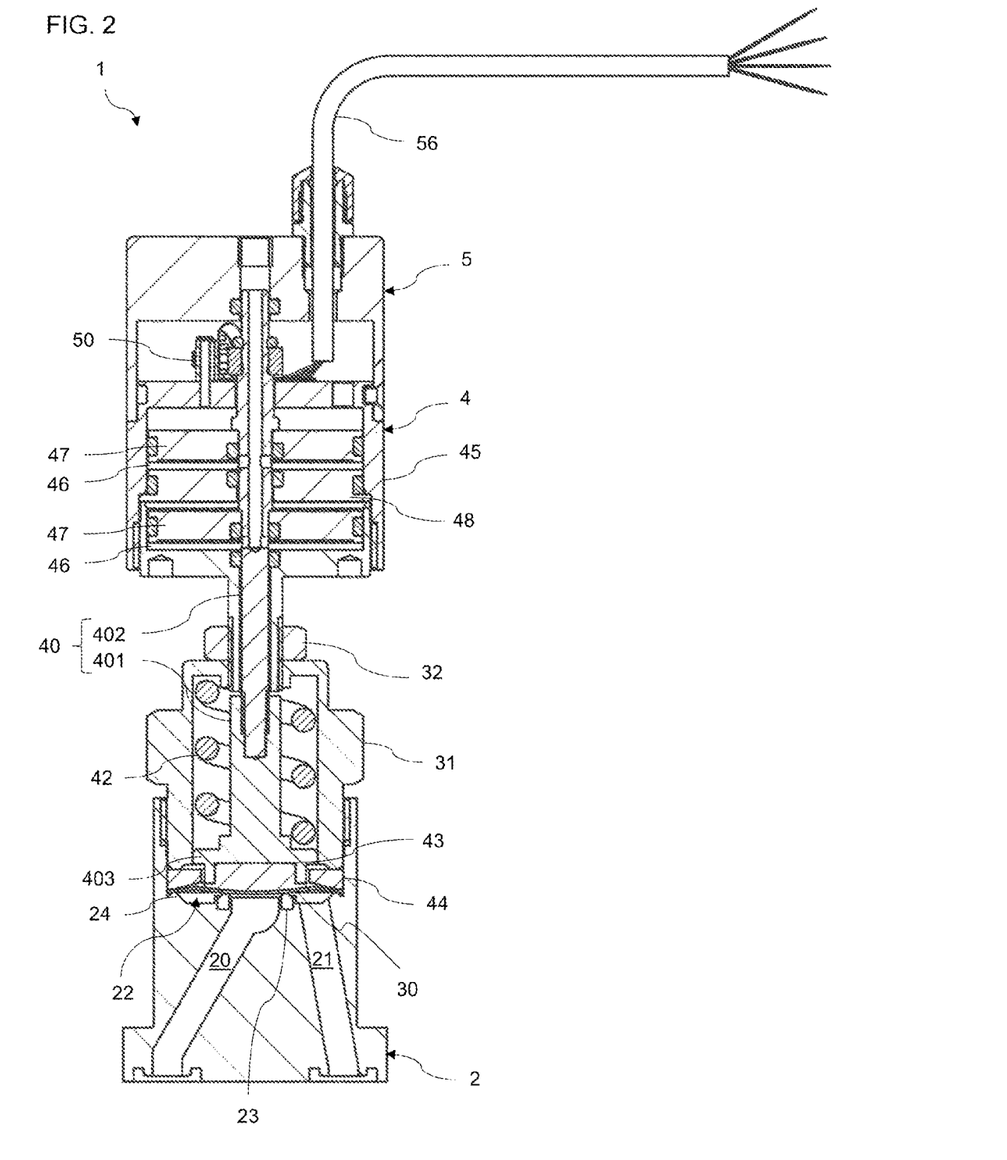
FIG. 2 is a cross-sectional view illustrating an internal structure of a valve according to an embodiment of the present invention.

An embodiment of the present invention will be described below with reference to the drawings. According to one embodiment of the present invention, FIG. 1 illustrates an external view of an air operation valve (hereinafter also referred to simply as a valve 1) having a sensor unit 5, and FIG. 2 illustrates a vertical cross section of the valve 1 when the valve is closed. In the following description, the directions of members and the like may be referred to as upper, lower, left, and right depending on the directions in the drawings for the sake of convenience, but these do not limit the directions of members or the like in the actual situation or an embodiment of the present invention.

The valve 1 is a metal diaphragm valve of a direct touch type, which is highly accurately controlling a microflow rate of a process fluid, and is provided with a valve body 2, a diaphragm 30, a bonnet 31, a bonnet nut 32, an actuator 4, a sensor unit 5 and the like. The valve 1 is used, for example, in a semiconductor manufacturing apparatus using a film formation technique of an ALD (Atomic Layer Deposition) method.

Valve Body 2

The valve body 2 is a member made of a steel material such as stainless and defines a fluid flow passage. Two flow passage ports are provided in a lower part of the valve body 2, and a fluid inflow passage 20 and a fluid outflow passage 21 are formed from the respective flow passage ports. A valve chamber 22 having a substantially concave cross section, which opens upward and communicates with the fluid inflow passage 20 and the fluid outflow passage 21, is formed on an upper part of the valve body 2. A synthetic resin valve seat 23 is provided on a bottom surface of the valve chamber 22, and an annular stepped part 24 is formed on a lower side of an inner peripheral surface of the valve chamber 22.

Diaphragm 30

The diaphragm 30 is a valve disk which operate to be able to open and close the fluid flow passage, has an extremely thin thickness, and is made of a metal material such as stainless steel or other shape memory alloys. This diaphragm 30 is arranged above the valve seat 23 and constituted of a plurality of diaphragms. Further, the diaphragm 30 has a dish-like shape in which a central part is curved upward in a natural state.

A retaining adapter 44 is an annular member attached to an inner peripheral surface of the valve chamber 22, and is pressed toward the stepped part 24 by a cylindrical lower end part of the bonnet 31. A peripheral edge of the diaphragm 30 is clamped and fixed by the stepped part 24 and the retaining adapter 44 so that an airtightness of the valve chamber 22 is maintained.

Bonnet 31

The bonnet 31 is formed in a substantially cylindrical shape with a lid, and a lower end of the cylindrical shape is inserted into the valve chamber 22 of the valve body 2 and threadedly engaged with an upper part of the cylindrical shape of the valve body 2. A stem 40 is arranged in the bonnet 31, and a coiled spring 42 is arranged around the stem 40. The spring 42 downwardly biases an expanding diameter part 403 formed at a bottom of the stem 40. At a bottom surface of the expanding diameter part 403, a diaphragm retainer 43, which is made of synthetic resin and is capable of being brought into contact with a top surface of a center part of the diaphragm 30, is fitted.

Actuator 4

The actuator 4 is a fluid operated drive mechanism that elevates and lowers the stem 40 by supplying or interrupting the working fluid from a fluid supply source not shown in the figures. As a result, the diaphragm 30, which is a valve disk, is brought into contact with or separate from the valve seat 23 to perform the opening and closing operation of the valve 1. The actuator 4 includes a housing 45, two pressure chambers 46 vertically partitioned in the housing 45, two pistons 47 vertically arranged in the housing 45 facing the individual pressure chambers 46, and one partitioning member 48 arranged between each of the pistons 47 in the housing 45. In addition, the actuator 4 may include a stroke adjustment mechanism that can be able to adjust a stroke amount by elevating and lowering the stem 40.

Figure 3:
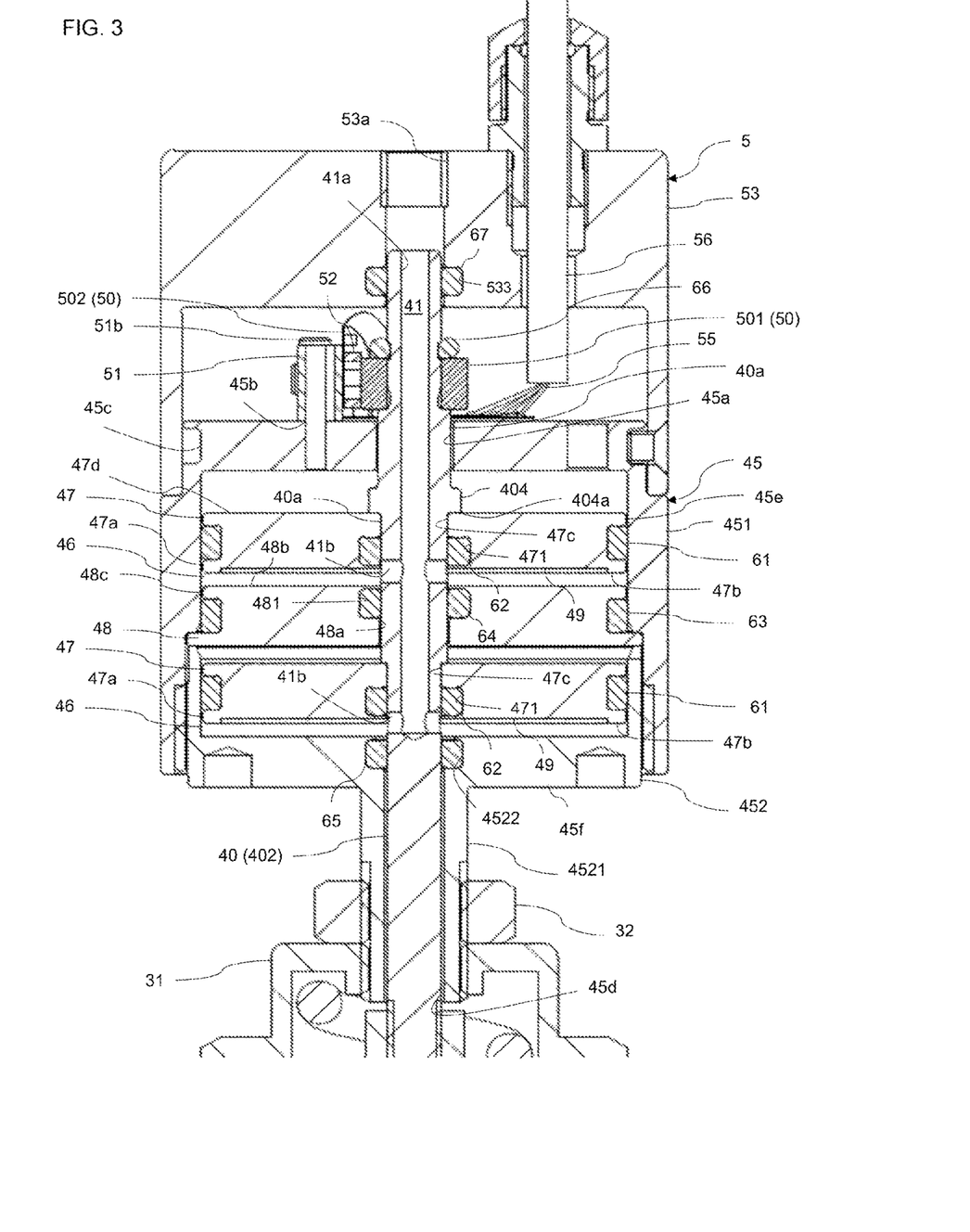
FIG. 3 is a partially enlarged cross-sectional view illustrating an internal structure of a valve according to an embodiment of the present invention.

FIG. 3 illustrates an enlarged view of the actuator 4. The housing 45 is formed by threadedly engaging to connect an upper side of an actuator cap 451 and a lower side of an actuator body 452.

The actuator cap 451 stores the pressure chamber 46, where the working fluid is supplied, inside of the actuator cap 451, and protrudes one end of the stem 40 to an outside, an opposite side to the diaphragm 30. In other words, a through hole 45a is formed in an upper part of the actuator cap 451 and the stem 40 is stored in the sensor unit 5 inserted into the through hole 45a. A flow passage 41 formed in the stem 40 includes an axial hole 41a extending in an axial direction of the stem 40 and two routes of radial holes 41b diverging in a radial direction from the axial hole 41a. The working fluid is supplied to two pressure chambers 46 from a supply port 53a through the axial hole 41a and the radial holes 41b in this order.

An opening 45d to insert the stem 40 is formed in a lower part of the cylindrical shape 4521 of the actuator body 452. By threadedly engaging the lower part of the cylindrical shape 4521 with the bonnet 31 and fastening a bonnet nut 32, the actuator 4 is fastened and fixed to the bonnet 31. The stem 40 is supported in the housing 45 to be able to elevate and lower.

Stem 40

The stem 40 includes a stem body 401 elevating and lowering in the bonnet 31, and a rod 402 extending from the housing 45 of the actuator 4 to the sensor unit 5, and their upper end and lower end threadedly engaged with each other. As a result, the stem body 401 and the rod 402 connected to each other integrally form the stem 40, and elevate and lower in the bonnet 31, the housing 45, and the sensor unit 5, which will be described later.

The rod 402 which forms the stem 40 is inserted to the through hole 45a formed in an upper surface of the actuator cap 451 and stored in the sensor unit 5. The flow passage 41 of the working fluid is provided in the rod 402, and this flow passage 41 communicates with the supply port 53a of the working fluid formed in an upper surface of a sensor cap 53. As a result, the working fluid supplied from the fluid supply source flows into the flow passage 41 through the supply port 53a.

Two pistons 47 are connected to the rod 402 constituting the stem 40 and stored in the housing 45 with the rod 402 to be able to elevate and lower. Each of the pistons 47 has a sliding outer peripheral surface 47a, a first pressure receiving surface 47b, and an inner peripheral surface 47c. The sliding outer peripheral surface 47a slides on an inner wall 45e of the housing 45 through an O-ring 61 as the stem 40 elevates and lowers. The first pressure receiving surface 47b has an annular shape, partitions the pressure chamber 46 together with the inner wall 45e, and receives a pressure of the working fluid.

Below the lower piston 47, the pressure chamber 46 is partitioned with the first pressure receiving surface 47b, the inner wall 45e, and a bottom wall 45f of the housing 45 which is a part of the inner wall 45e. The inner peripheral surface 47c of the piston 47 is fixed to an outer peripheral surface 40a of the stem 40 through the O-ring 62 with an intermediate fitting rather than an interference fitting such as press-fitting. A first fitting part 471 is formed in the inner peripheral surface 47c.

The stem 40 is provided with a flange part 404. The flange part 404 is formed by enlarging the outer peripheral surface 40a of the stem 40, and a lower surface 404a of the flange part 404 is in contact with an upper surface 47d of an upper side of the piston 47. As a result, when the working fluid is supplied to the pressure chamber 46, the stem 40 is pushed up with the piston 47 by pressures of each of the pressure chamber 46 to rise.

When the valve 1 is assembled, the O-ring 62 is fitted into the first fitting part 471 either before or after the piston 47 is connected to the stem 40. Since the piston 47 is not press-fitted into the stem 40, the O-ring 62 can be reliably prevented from damaged, entangled and broken, and a sealing function of each of the pressure chambers 46 can be achieved.

Further, a state of the O-ring 62 can be easily and visually confirmed from the first fitting part 471. Therefore, even if the O-ring 62 is damaged, entangled or broken, these conditions can be detected at an early stage. Further, the O-ring 62 is fitted into the first fitting part 471 with friction while its own elastic force due to collapse and deformation acts on the inner wall of the first fitting part 471. Therefore, the O-ring 62 does not fall off even when the piston 47 elevates and lowers.

Furthermore, since the O-ring 62 is exposed to the pressure chamber 46, when the valve 1 is fully opened, the O-ring 62 is pressed against the inner wall of the first fitting part 471 by the pressure of the working fluid acting on the pressure chambers 46. This pressing force further promotes collapse and deformation of the O-ring 62 in the first fitting part 471, and further improves a sealing performance of each of the pressure chambers 46.

In addition, the O-ring 62 may be exposed to the pressure chambers 46 and in contact with the working fluid, and may thermally expand in response to a temperature at which the working fluid is exposed. When such thermal expansion of the O-ring 62 occurs in a fitting groove with a limited space as in conventional cases, deterioration such as hardening, softening, swelling, and etc. of the O-ring 62 may occur since the thermal expansion is restricted and there is no place for heat to escape.

However, in the case of the present embodiment, the O-ring 62 is fitted into the first fitting part 471 to ensure a degree of freedom of thermal expansion to a certain extent and to secure an escape path of heat to a certain extent. Therefore, the deterioration of the O-ring 62 caused by the thermal expansion and influence on the sealing performance of the pressure chambers 46 are reduced.

The partitioning member 48 is fixed to the inner wall 45e between the two pistons 47, and partitions an upper side of the pressure chambers 46 with the first pressure receiving surface 47b of the upper side of the piston 47 and the inner wall 45e. Specifically, the partitioning member 48 has a sliding inner peripheral surface 48a, a second pressure receiving surface 48b, and a fixed outer peripheral surface 48c. The sliding inner peripheral surface 48a slides on the outer peripheral surface 40a of the stem 40 through an O-ring 63 as the stem 40 elevates and lowers.

The second pressure receiving surface 48b has an annular shape, partitions the pressure chambers 46 together with the inner wall 45e and the first pressure receiving surface 47b, and receives the pressure of the working fluid. The fixed outer peripheral surface 48c is fixed to the inner wall 45e through the O-ring 63. In the sliding inner peripheral surface 48a, the outer peripheral surface 40a of the stem 40 slides as the stem 40 elevates and lowers. Further, a second fitting part 481 is formed in the sliding inner peripheral surface 48a.

The second fitting part 481 is formed by cutting off a corner part extending from the sliding inner peripheral surface 48a to the second pressure receiving surface 48b over an entire circumference, and an O-ring 64 is fitted therein. As a result, the stem 40 is airtightly slid against the partitioning member 48, and a sealing function of the upper side of the pressure chambers 46 is secured. In addition, as in the case of the O-ring 62, the O-ring 64 is fitted into the second fitting part 481 with friction by its own elastic force due to collapse and deformation.

Therefore, the O-ring 64 does not fall off even when the stem 40 elevates and lowers. Further, as in the case of the O-ring 62, the O-ring 64 is exposed to the pressure chambers 46. Therefore, when the valve 1 is fully opened, the O-ring 64 is pressed against the inner wall of the second fitting part 481 by the pressure of the working fluid acting on the pressure chambers 46. This pressing force further promotes collapse and deformation of the O-ring 64 in the second fitting part 481, and further improves the sealing performance of each of the pressure chambers 46.

Further, as in the case of the O-ring 62, since the O-ring 64 is fitted into the second fitting part 481, thermal expansion is allowed to some extent. Therefore, advertise effects caused by the thermal expansion of the O-ring 64 in a limited space as in the conventional cases, or deterioration of the O-ring 64 and influence on the sealing performance of a lower side of the pressure chamber 46, are reduced.

Further, the bottom wall 45f of the housing 45 has a function similar to that of the partitioning member 48 in a sense of partitioning the lower side of the pressure chambers 46, and an O-ring 65 is exposed to the pressure chambers 46 and fitted into a third fitting part 4522 provided on the bottom wall 45f, and has a function similar to that of the O-ring 64. Therefore, the sealing function of the lower side of the pressure chambers 46 is secured.

The first pressure receiving surface 47b is formed with a counterbored part 49 through which the radial holes 41b of the flow passage 41 communicates when the first pressure receiving surface 47b is brought into contact with the second pressure receiving surface 48b or the bottom wall 45f as the stem 40 lowers. When a stroke amount of the stem 40 is increased by a stroke adjusting mechanism, the first pressure receiving surface 47b may come into contact with the second pressure receiving surface 48b or the bottom wall 45f as the stem 40 lowers. When the first pressure receiving surface 47b is brought into contact with the second pressure receiving surface 48b or the bottom wall 45f, malfunction of the valve 1 may occur since a required volume of the pressure chambers 46 cannot be secured and the radial holes 41b are blocked. In addition, there is a possibility that the O-ring 62 comes into contact with the partitioning member 48 and the O-ring 62 is damaged.

However, by forming the counterbored part 49 on the first pressure receiving surface 47b, even if the first pressure receiving surface 47*b* comes into contact with the second pressure receiving surface 48*b*, the working fluid can be supplied to a space of the counterbored part 49 since the radial holes 41*b* are opened in the space of the counterbored part 49. Therefore, the space of the counterbored part 49 is secured as the pressure chambers 46.

Further, it is not necessary to secure a large pressure chamber 46 when the valve 1 is fully closed in anticipation of a safety factor in order to avoid contact between the first pressure receiving surface 47*b* and the second pressure receiving surface 48*b* and the bottom wall 45*f*, and it is not necessary to secure an outer shape of the actuator 4 longer in the axial direction. Therefore, the valve 1 can be miniaturized while ensuring a reliability of the actuator 4, and, consequently, the valve 1.

In addition, the stroke amount of the stem 40 can be adjusted smaller by the stroke adjustment mechanism to improve responsiveness and controllability of the opening and closing operation of the valve 1. Further, the O-ring 62, the O-ring 64, and the O-ring 65 are exposed to the counterbored part 49 when the first pressure receiving surface 47*b* comes into contact with the second pressure receiving surface 48*b* as the stem 40 lowers.

As a result, when the valve 1 is shifted from a fully closed state to a fully open state and the working fluid is supplied to the pressure chambers 46, the O-ring 62, the O-ring 64 and the O-ring 65 are pressed by the working fluid and are crushed and deformed in the space of the counterbored part 49. Thus, even if the first pressure receiving surface 47*b* comes into contact with the second pressure receiving surface 48*b*, the sealing function of each pressure chambers 46 is secured by forming the counterbored part 49.

Opening and Closing Operation of Valve

Next, an opening and closing operations of the valve 1 will be described. When the working fluid is supplied to the two pressure chambers 46 through the flow passage 41 from the supply port 53*a*, the piston 47 and the stem 40 are pulled up against an elastic force of the spring 42 by the pressures of each pressure chambers 46. As a result, the diaphragm 30 becomes a natural state having a convex cross section by its own restoring force and is separated from the valve seat 23, and the valve 1 is opened.

On the other hand, the supply of the working fluid from the supply port 53*a* is stopped and the pressures inside of the flow passage 41 and the two pressure chambers 46 are released, the piston 47 and the stem 40 are lowered by the elastic force of the spring 42. As a result, a central part of the diaphragm 30 is pressed downward by the diaphragm retainer 43, is deformed into a concave cross section shape against its own restoring force and is separated from the valve seat 23, and the valve 1 is closed.

Sensor Unit 5

The sensor unit 5 is a functional unit sensing an operation of the valve 1, and as illustrated in FIGS. 2 to 5, it is provided above the actuator 4. This sensor unit 5 has an opening and closing operation detecting sensor 50 composed with a magnet 501 and a magnetic sensor 502, and a sensor cap 53, and the opening and closing operation detecting sensor 50 is stored in the sensor cap 53.

The sensor cap 53 is attached above the actuator cap 451 and covers the opening and closing operation detecting sensor 50 and the like with a part protruding from the actuator cap 451 of the stem 40. An upper surface of the sensor cap 53 is provided with the supply port 53*a* of the working fluid, a cable outlet 53*b* leading a cable 56 to an outside, and a through hole 53*c* where an LED cap 53*d* is fitted.

An annular fourth fitting part 533 is formed at a part leading to the supply port 53*a* of the working fluid and at a position corresponding to an upper part of the stem 40. An O-ring 67 is fitted into the fourth fitting part 533, and as a result, airtightness between the sensor cap 53 and the stem 40 is maintained in a vicinity of the supply port 53*a*.

A cable holder 561 holding the cable 56 is provided in the cable outlet 53*b*, and the cable 56 is prevented from wobbling or being bent at a part of the cable outlet 53*b* by this cable holder 561. The LED cap 53*d* has translucency and is a member having a shape that conforms to shape the through hole 53*c*. This LED cap 53*d* transmits a light of an LED stored in the sensor cap 53 to an outside at a state of being fitted into the through hole 53*c*.

A bolt hole 53*e* for attaching the sensor cap 53 to the actuator cap 451 is formed on a side of the sensor cap 53. As illustrated in FIG. 6, FIG. 7A, FIG. 7B, and FIG. 7C, this bolt hole 53*e* is in a shape that conforms to shape the bolt 53*f*, and is provided with an expanding diameter part 531 tapered outward and a hole part 532 conforming to shape a shank part of the bolt 53*f*. On an inner peripheral surface of the hole part 532, an internal thread corresponding to an external thread formed on an outer peripheral surface of the bolt 53*f* is formed, and is threadedly engaged with the bolt 53*f*.

Figure 6:
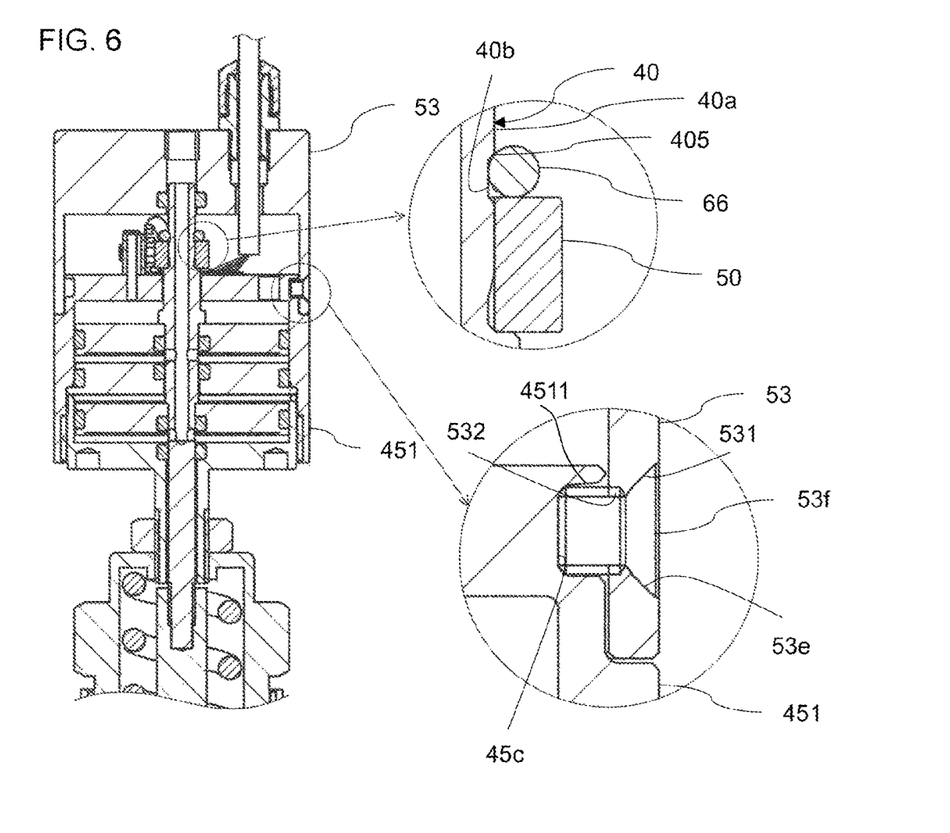
FIG. 6 is a partially enlarged cross-sectional view illustrating an internal structure of a valve according to an embodiment of the present invention.

Above an outer peripheral surface of the actuator cap 451 where the sensor cap 53 is attached, a lower part of the sensor cap 53 is covered and a concaved fastening groove 45*c* fastening a tip of the bolt 53*f* is formed. When the actuator cap 451 is covered with the sensor cap 53 from top, the bolt hole 53*e* is positioned at a place where the fastening groove 45*c* is formed. In addition, in a vicinity of an opening of the fastening groove 45*c*, an inclined part 4511, tapered so as to expand diameter toward an outside, is provided.

Figure 7A:
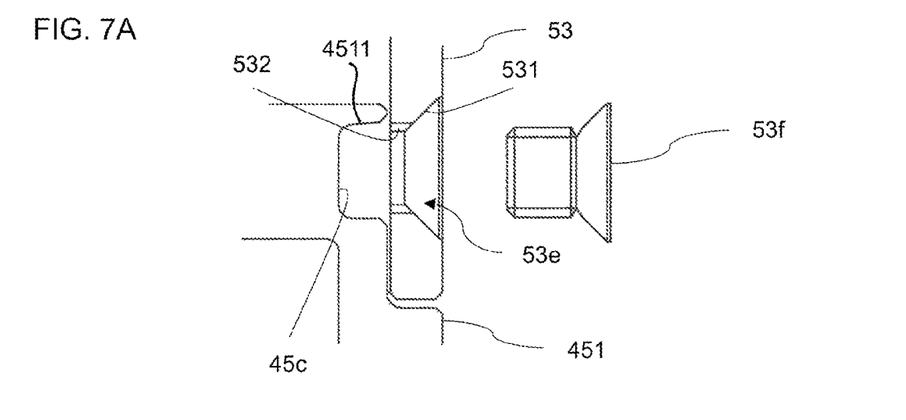
FIG. 7A is a diagram illustrating a process to fasten a bolt when attaching a sensor cap to an actuator cap in a valve according to the present embodiment.
Figure 7B:
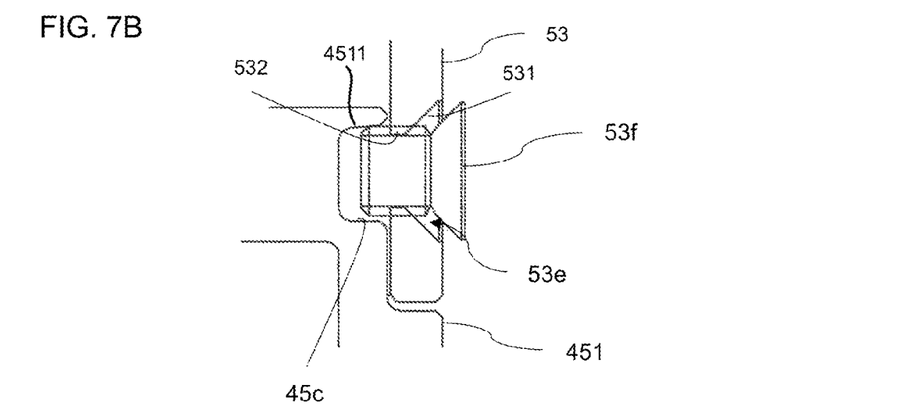
FIG. 7B is a diagram illustrating a process to fasten a bolt when attaching a sensor cap to an actuator cap in a valve according to the present embodiment.
Figure 7C:
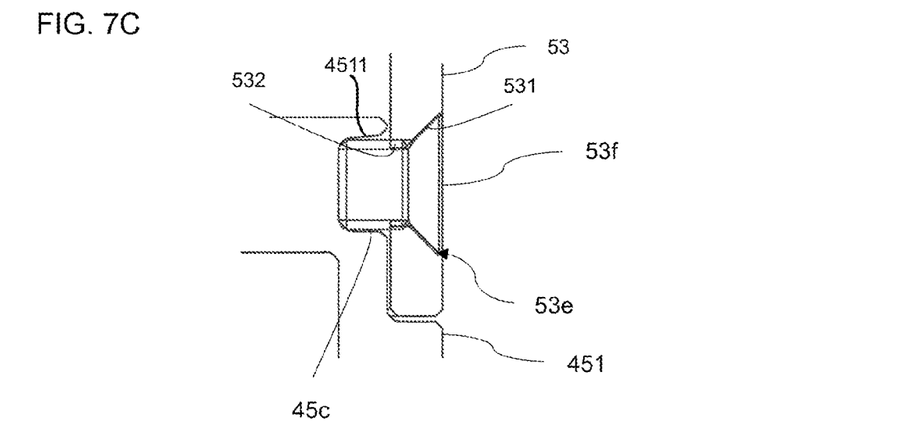
FIG. 7C is a diagram illustrating a process to fasten a bolt when attaching a sensor cap to an actuator cap in a valve according to the present embodiment.

Referring now to FIG. 7A, FIG. 7B, and FIG. 7C, a process to mount the sensor cap 53 and the actuator cap 451 will be described. First, as illustrated in FIG. 7A, the actuator cap 451 is covered with the sensor cap 53. Then, as illustrated in FIG. 7B, the bolt 53*f* is inserted from the bolt hole 53*e* of the sensor cap 53 to the fastening groove 45*c* of the actuator cap 451, and the external thread of the bolt 53*f* is threadedly engaged with the internal thread of the hole part 532. At this time, the tip of the shank part of the bolt 53*f* is guided deep into the hole part 532 while contacting with the expanding diameter part 531. As illustrated in FIG. 7C, the bolt 53*f* is threadedly engaged with the bolt hole 53*e* and is fastened deep into the fastening groove 45*c*. At this time, a tip of the shank part of the bolt 53*f* is guided to a groove bottom of the fastening groove 45*c* by the inclined part 4511 formed in the fastening groove 45*c* of the actuator cap 451. When the tip of the shank part of the bolt 53*f* is pressed against the groove bottom of the fastening groove 45*c*, the sensor cap 53 is fixed to be un-rotatable toward the actuator cap 451.

As a result of fixing the sensor cap 53 to the fastening groove 45*c* provided in the actuator cap 451 with the bolt 53*f*, alignments between the cable outlet 53*b* of the sensor cap 53 and the cable 56, and between the LED cap 53*d* and the LED 57, are easy, unlike the case where the sensor cap 53 is threadedly engaged with the actuator cap 451 to be attached while being rotated. In addition, even in a state where the cable 56 is led out from the cable outlet 53*b*, the cable 56 can be fixed without applying a burden. Furthermore, since the sensor cap 53 is attached to the actuator cap 451 by fastening the bolts 53*f* at three places from the side, the sensor cap 53 is not inclined with respect to the actuator cap 451. Further, the inclined part 4511 formed in the fastening groove 45c of the actuator cap 451 serves as a guide, so that fastening positions in an axial direction of the bolts 53f at the three places becomes equal to each other, and the sensor cap 53 does not incline.

Opening and Closing Operation Detecting Sensor 50

In this embodiment, the opening and closing operation detecting sensor 50 is attached on an upper surface of an outer surface of the actuator cap 451. This opening and closing operation detecting sensor 50 has a detecting means to detect an opening and closing operation of the diaphragm 30 accompanying the elevating and lowering of the stem 40, or the opening and closing operation of the valve 1, based on changes in a magnetic field caused by elevating and lowering of the magnet 501 attached to the stem 40. Further, the pressure in the pressure chamber 46, the stroke amount of the diaphragm retainer 43, and a thrust force and an average moving speed of the piston 47, can be detected or calculated based on the changes in the magnetic field. Information obtained from this opening and closing operation detecting sensor 50 can be used for abnormality determination of the operation of the valve 1.

Figure 4:
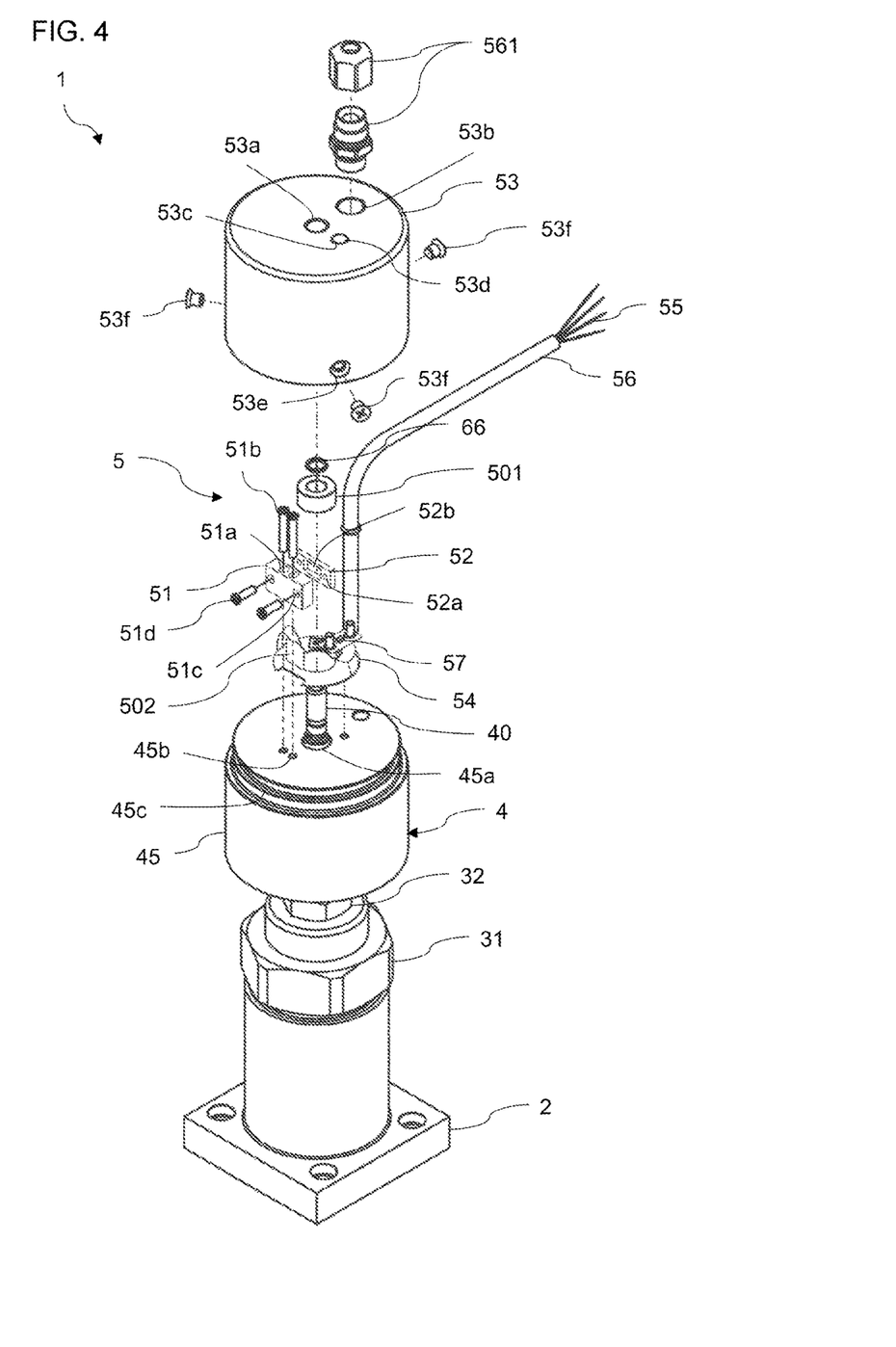
FIG. 4 is an exploded perspective view illustrating a sensor unit of a valve according to an embodiment of the present.

As illustrated in FIG. 3 and FIG. 4, the magnet 501 is a ring-shaped magnetic body and is attached to a stepped part provided in the stem 40 so that the stem 40 protruding upward from the through hole 45a of the actuator cap 451 is inserted therethrough. Since the magnet 501 is in a ring-shaped, a magnetic field generated by the magnet 501 can be reliably and accurately detected regardless of a position of the magnetic sensor 502 provided around the stem 40.

In addition, at a predetermined position of the stem 40, an O-ring 66 is provided as an elastic member for fixing the magnet 501 to the stem 40, and this O-ring 66 contacts with the magnet 501 from above and to fix the magnet 501 to the predetermined position of the stem 40. As illustrated in FIG. 6, an annular recess 40b is formed on a part which is an outer peripheral surface 40a of the stem 40 and is extending from the through hole 45a of the actuator cap 451. This recess 40b is formed at regular intervals along a circumferential direction of the stem 40. In addition, an inclined part 405, tapered so as to expand diameter from an inside to an outside, is provided at an upper and lower ends of the recess 40b.

As a result, the O-ring 66 is fitted into the recess 40b, so that the O-ring 66 holds down the magnet 501 without shifting in the axial direction of the stem 40, and the magnet 501 is reliably fixed to the predetermined position. In particular, the O-ring 66 contacts with the inclined part 405 in an upper part of the recess 40b so as to be pressed downward, so that the magnet 501 is pressed downward from above to be firmly fixed. Further, since an upper surface of the magnet 501 is in contact with the O-ring 66 over an entire circumference and is restrained by generating frictional resistance, a rotation of the magnet 501 in the circumferential direction with respect to the stem 40 is prevented. In addition, by fixing with an elastic member of the O-ring 66, it is possible to suppress vibration or the like during the opening and closing operation of the valve 1 transmitted from the stem 40 to the magnet 501. As a result, the magnetic sensor 502 can accurately detect the magnetic field generated by the magnet 501 moving only in a vertical direction. Further, the magnet 501 can be attached or detached by attaching or detaching the O-ring 66, which is simple.

Since the stem 40 is fixed so as to be vertically movable by the O-rings 65 and 67, the stem 40 vertically moves along the axial direction without tilting. In addition, since the stem 40 is held by a plurality of O-rings, and the stem is not rotated by a spring 42 and the like which is wound around the stem 40, the magnet 501 is not rotated together with the stem 40.

In addition, in the present embodiment, a diameter of the stem 40 is slightly smaller than that of other parts at a position where the magnet 501 is attached, and a lower end surface of the magnet 501 is supported so as to be in contact with a stepped surface of the stem 40 without any gap.

The magnetic sensor 502, for example, is a contactless sensor using the Hall effect, detects the magnetic field into an electric signal magnetic field generated by the magnet 501, converts a change in the magnetic field into an electric signal, and outputs the electric signal. An operation type of the magnetic sensor 502 may be any, but for example, a latching type or a switching type may be used. In addition, it may be using a coil, or it may be using an AMR element whose resistance value changes according to a strength and direction of the magnetic field, as long as a position of the magnet 501 can be detected without contact in combination with the magnet 501.

Figure 5:
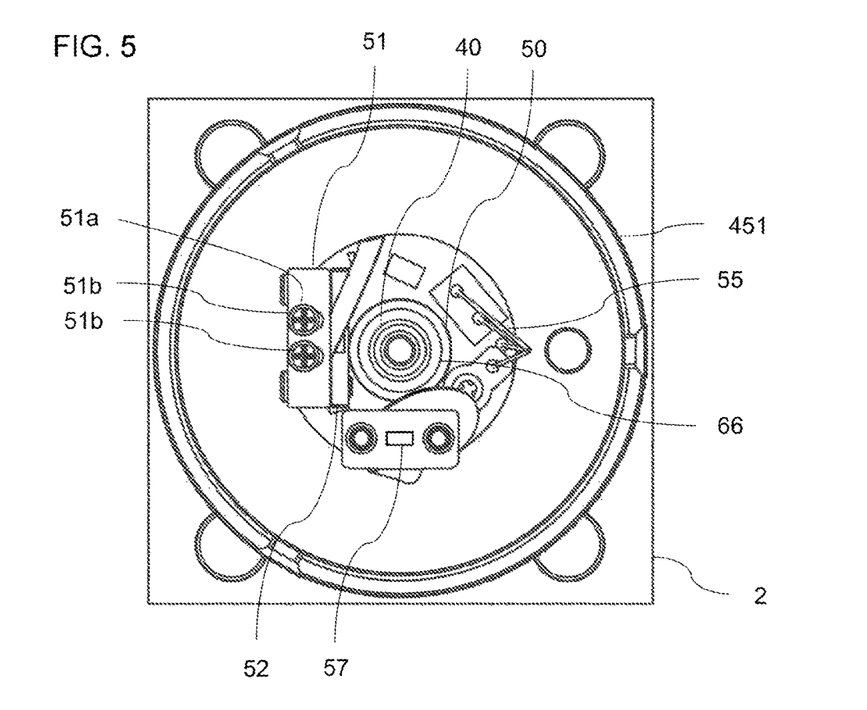
FIG. 5 is a plan view of a sensor unit of a valve according to an embodiment of the present invention.

As illustrated in FIG. 4 and FIG. 5, the magnetic sensor 502 is clamped and fixed by a sensor base 51 and a sensor holder 52. In this embodiment, the sensor base 51 is formed in a rectangular parallelepiped shape, and is provided with an elongated hole 51a for fixing to the upper surface of the actuator cap 451 and a bolt hole 51c for attaching the sensor holder 52.

The elongated hole 51a is an elliptic shape hole having a length in a radial direction of the stem 40 when the sensor base 51 is attached on the actuator cap 451. As a result, the sensor base 51 can adjust a position to attach within a range where the bolt hole 45b of the actuator cap 451 and the elongated hole 51a of the sensor base 51 overlap. By adjusting the position to attach the sensor base 51 within the range of a length of the elliptic shape elongated hole 51a, the sensor holder 52 can move closer to or conversely away from the magnet 501 attached to the stem 40 to fix, and a distance between the magnet 501 and the magnetic sensor 502 held by the sensor holder 52 can be adjusted. In such a configuration, it can be said that the elongated hole 51a constitutes an adjusting means adjusting the distance between the magnetic sensor 502 and the magnet 501.

In this embodiment, the sensor holder 52 is formed of a rectangular plate-like member and has a pair of the bolt holes 52a to which the bolts 51d are threadedly engaged, and an opening 52b is provided between the pair of the bolt holes 52a. The sensor holder 52 is attached to a surface on a side of the stem 40 of the sensor base 51, and is fixed to the sensor base 51 while the magnetic sensor 502 is clamped by the bolts 51d which are threadedly engaged with the bolt holes 52a through the bolt holes 51c.

When the magnetic sensor 502 is clamped by the sensor holder 52 and the sensor base 51, the magnetic sensor 502 is exposed from the opening 52b to a side of the magnet 501. As a result, the magnetic sensor 502 can reliably detect the magnetic field generated by the magnet 501.

The magnetic sensor 502 is connected to a circuit board 54, and wirings 55 are integrated from the circuit board 54 and led out of the valve 1 as the cable 56 through the cable outlet 53b of the sensor cap 53. The circuit board 54 includes a processing module for transmitting information obtained by the magnetic sensor 502 and for executing information processing based on the information. As a result, the information can be transmitted to an external terminal or the like through the cable 56.

In this embodiment, the circuit board 54 is attached to the upper surface of the actuator cap 451 with the sensor base 51. For example, a flexible printed circuit (FPC) is used for the circuit board 54, and a gap between the members can be used as a wiring path to the magnetic sensor 502. In addition, the processing module may be stored in the valve 1 separately from the circuit board 54, or may be provided as a part of the magnetic sensor 502.

An LED 57 is connected to the circuit board 54. The LED 57 is a notification means for notifying status information such as a detection result by the magnetic sensor 502, an analysis result based on the detection result, or a detection error, and emits light in a predetermined color or light emitting pattern according to contents of the notification. The light from the LED 57 is visible from the outside through the LED cap 53d.

According to the valve 1 of the present embodiment, the operation of the valve 1 can be accurately detected. In particular, since the magnet 501 is securely fixed to the stem 40 and the stem 40 exhibits stable behavior without tilting, a detection accuracy of the opening and closing operation is high. Furthermore, the sensor unit 5 is provided above the valve 1, and replacement and visual recognition are easy. In particular, since the sensor unit 5 is attached to the outside of the actuator cap 451, maintenance such as replacement of the sensor unit 5 itself or the magnet 501 constituting the sensor unit 5 by a member unit can be performed without touching parts, such as the pressure chamber 46 of the actuator 4 or the spring 42, that affect driving.

Figure 8:
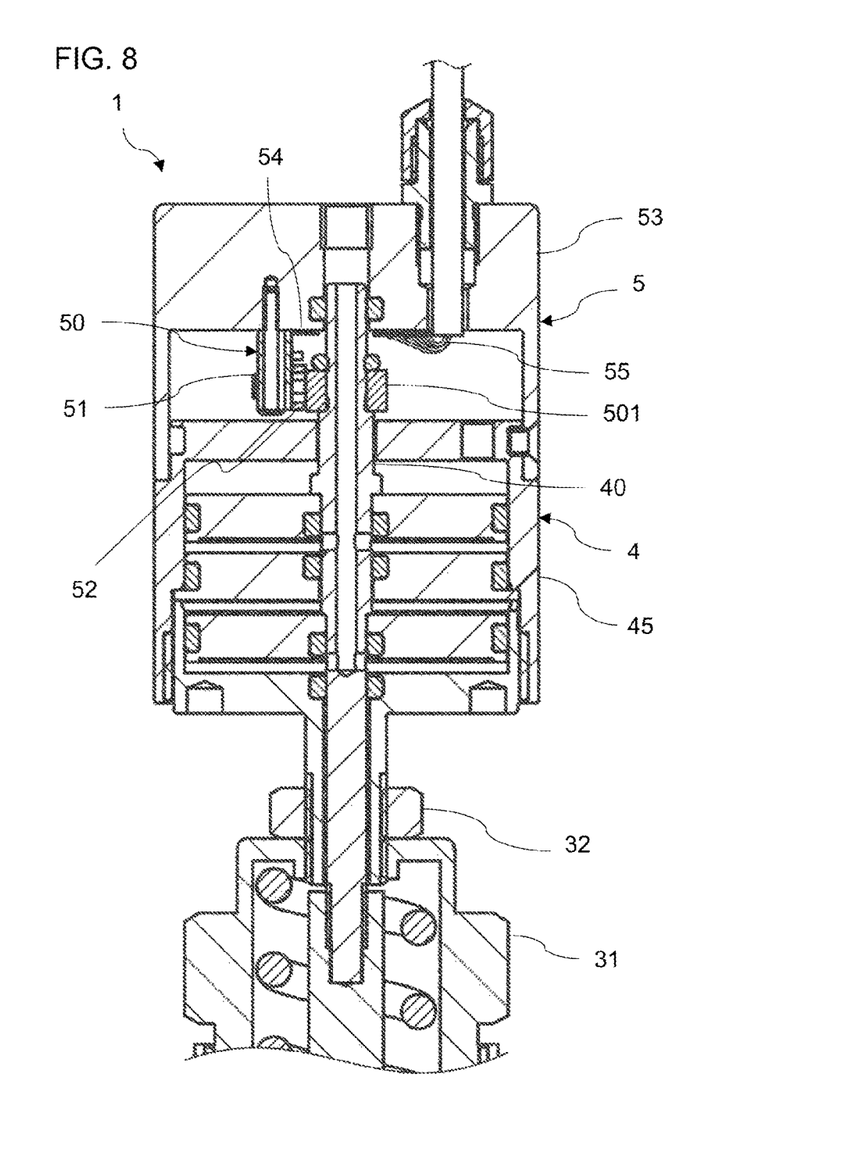
FIG. 8 is a cross-sectional view illustrating an internal structure of a valve according to another embodiment of the present invention.

In another embodiment of the present invention, as illustrated in FIG. 8, the sensor base 51 or the circuit board 54 may be attached to a top surface of the inside of the sensor cap 53, whereby the opening and closing operation detecting sensor 50 can be attached to the inside of the sensor cap 53. As a result, the opening and closing operation detecting sensor 50 can be easily replaced by changing the sensor cap 53. In addition, since a vibration of the actuator 4 is less likely to be transmitted to the opening and closing operation detecting sensor 50, it is suitable for improving detection accuracy.

In the above-described present embodiment, the valve 1 may be provided with an information display means, such as a liquid crystal panel, for displaying operation information. In addition, a means for outputting a notification sound may be provided in accordance with a processing result by a stored software application.

Figure 9:
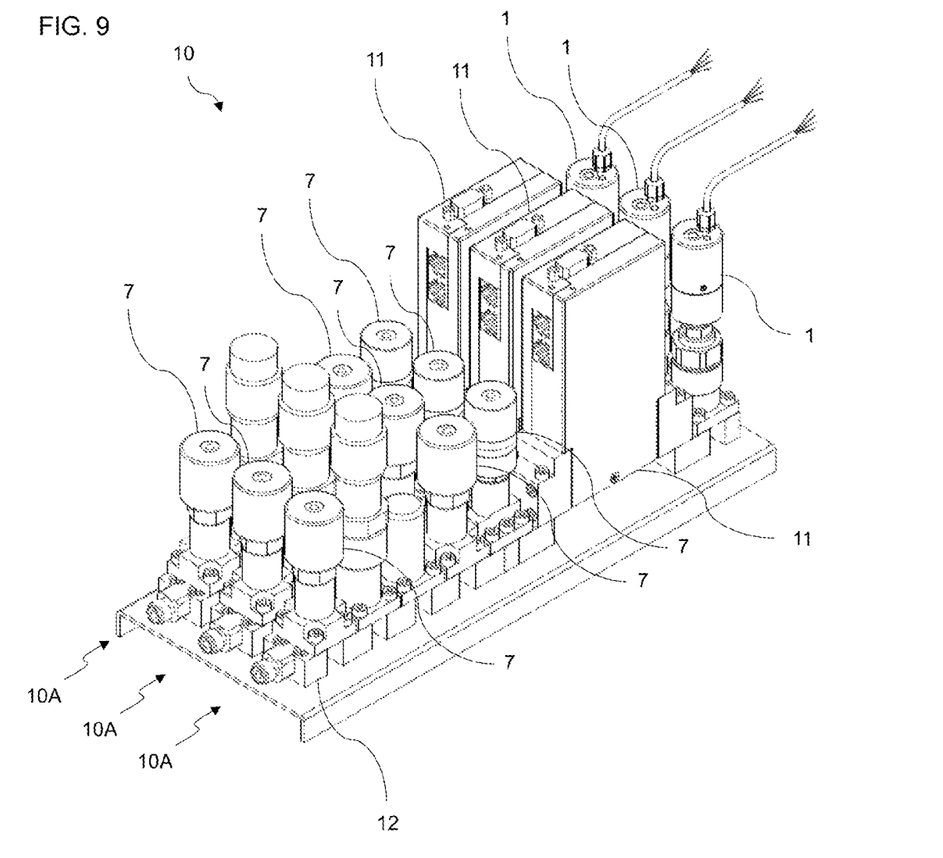
FIG. 9 is an external perspective view illustrating an example of a fluid control device in which a plurality of valves according to the present embodiment are integrated.

As illustrated in FIG. 9, a plurality of the valves 1, described above, may constitute a fluid control device 10 (gas unit) together with a flow rate control device 11 (hereinafter also referred to as a mass flow controller 11) and the like. The fluid control device 10 is provided by a plurality of gas lines 10A (three lines in FIG. 9) adjacent in a width direction and each of the gas lines 10A is installed on a base metal plate. In each of the gas lines 10A on the substrate, a plurality of valves 1 and 7, connected through a block joint 12, are arranged in a row together with components, such as the mass flow controller 11. In the present embodiment, the valve 1 is provided on a downstream side of the flow rate control device 11, but the valve 1 may be provided on a side of the valve 7.

In addition, the counterbored part 49 and the actuator 4 may be provided with a pair of the piston 47 and the pressure chamber 46 for each, or two or more for each. Further, the actuator 4 and the sensor unit 5 are not limited to the air operation valve, and can be applied to a valve having other driving source or a driving object other than the valve. In addition, the actuator cap 451 and the actuator body 452 are fastened by threadedly engaged, but they may be fastened by other fastening methods. Further, the stem 40 is constituted by the rod 402 and the stem body 401, but it may be integrally formed. Although the present embodiment illustrates a two-way valve in which two flow passages, the fluid inflow passage 20 and the fluid outflow passage 21 are formed in the valve body 2, a three-way valve having three flow passages may be used.

REFERENCE SIGNS LIST 1 valve
2 valve body
10 fluid control device
30 diaphragm (valve disk)
31 bonnet
32 bonnet nut
4 actuator
40 stem
401 stem body
402 rod
405 inclined part
42 spring
451 actuator cap
4511 inclined part
452 actuator body
45a through hole
45b bolt hole
45c fastening groove
46 pressure chamber
47 piston
48 partitioning member
5 sensor unit
50 opening/closing operation detecting sensor (detecting means)
501 magnet (magnetic body)
502 magnetic sensor
51 sensor base
51a elongated hole
51b bolt
51c bolt holes
51d bolt
52 sensor holder
52a bolt hole
52b opening
53 sensor cap
53a supply port
53b cable outlet
53c through hole
53d LED cap
53e bolt holes
53f bolt
54 circuit board
55 wiring
56 cable
61, 62, 63, 64, 65, 66, 67 O-ring

The invention claimed is:
1. A valve comprising:
a valve body defining a fluid flow passage;
a valve disk configured to be operable to open and close the fluid flow passage;
an actuator configured to drive, with a driving force, the valve disk by supplying or interrupting a working fluid;
a stem configured to transmit the driving force of the actuator to the valve disk, wherein the stem extends in an axial direction and is configured with a stepped surface, an outer peripheral surface, and a recess that extends along a circumferential direction on the outer peripheral surface and is spaced from the stepped surface by a distance in the axial direction;

a detection means configured to detect an opening and closing operation of the valve disk; and an elastic member configured to fit in the recess in an arrangement fixing a ring-shaped magnetic body, inserted through an end of the stem, against the stepped surface of the stem;

wherein the detection means comprises:

the ring-shaped magnetic body fixed against the stepped surface of to the stem by the elastic member, and a magnetic sensor configured to detect a change in a magnetic field of the ring-shaped magnetic body.

2. The valve according to claim 1, wherein
the recess is an annular recess that is configured with an inclined surface having a diameter expanding outward to the outer peripheral surface of the stem.

3. The valve according to claim 1,
wherein the actuator comprises an actuator cap storing a pressure chamber, to which a working fluid is supplied, inside, and protruding one end of the stem to an outside on a side opposite to the valve disk,
the valve further comprising:

a sensor cap covering the detection means together with one end of the stem, and a bolt inserted into a bolt hole of the sensor cap, wherein the bolt is fastened to a fastening groove provided on an outer peripheral surface of the actuator cap.

4. The valve according to claim 3, wherein an inclined part, having a diameter expanding outward, is formed in a vicinity of the fastening groove.

5. The valve according to claim 3, wherein the magnetic sensor is attached to an outer surface of the actuator cap.

6. The valve according to claim 3, wherein the magnetic sensor is attached to an inside of the sensor cap.

7. A fluid control device comprising a valve,
wherein the valve comprises:

a valve body defining a fluid flow passage;

a valve disk configured to be operable to open and close the fluid flow passage;

an actuator configured to drive, with a driving force, the valve disk by supplying or interrupting a working fluid;

a stem configured to transmit the driving force of the actuator to the valve disk, wherein the stem extends in an axial direction and is configured with a stepped surface, an outer peripheral surface, and a recess that extends along a circumferential direction on the outer peripheral surface and is spaced from the stepped surface by a distance in the axial direction;

a detection means configured to detect an opening and closing operation of the valve disk; and an elastic member configured to fit within the recess in an arrangement fixing a ring-shaped magnetic body, inserted through an end of the stem, against the stepped surface of the stem;

wherein the detection means comprises:

the ring-shaped magnetic body fixed against the stepped surface of the stem by the elastic member, and a magnetic sensor configured to detect a change in a magnetic field of the magnetic body.

8. The valve according to claim 1, wherein the elastic member comprises an O-ring.

* * * * *